United States Patent [19]
Yoshida et al.

[11] Patent Number: 4,822,538
[45] Date of Patent: Apr. 18, 1989

[54] PROCESS FOR PRODUCING A CARBONACEOUS THIN PLATE

[75] Inventors: Akio Yoshida; Shigetoshi Ajima; Masaru Hiruta; Hatsuo Saito, all of Iwaki, Japan

[73] Assignee: Kureha Kagaku Kogyo Kabushiki Kaisha, Tokyo, Japan

[21] Appl. No.: 894,333

[22] Filed: Aug. 8, 1986

[30] Foreign Application Priority Data

Aug. 23, 1985 [JP] Japan ................................. 60-185340

[51] Int. Cl.$^4$ ............................................. B29C 43/02
[52] U.S. Cl. .................................... 264/29.4; 264/29.5; 264/29.6; 264/29.7; 264/105; 264/338
[58] Field of Search ..................... 264/29.4, 29.6, 29.7, 264/105, 338, 29.5

[56] References Cited

U.S. PATENT DOCUMENTS

| | | | |
|---|---|---|---|
| 4,064,207 | 12/1977 | DeCrescente et al. | 264/29.6 |
| 4,226,816 | 10/1980 | Yamamoto et al. | 264/29.4 |
| 4,359,438 | 11/1982 | Hoggins et al. | 264/105 |
| 4,506,028 | 3/1985 | Fukuda et al. | 264/29.5 |
| 4,619,796 | 10/1986 | Awata et al. | 264/29.6 |
| 4,627,944 | 12/1986 | Murakami et al. | 264/29.4 |

FOREIGN PATENT DOCUMENTS 0118232 9/1984 European Pat. Off. .
0127887 12/1984 European Pat. Off. .

Primary Examiner—Jeffery Thurlow
Attorney, Agent, or Firm—John P. White

[57] ABSTRACT

Disclosed herein are a process for producing a carbonaceous thin plate comprising disposing a composite material comprising a carbonaceous raw material which is carbonized and solidifies after being softened by heating and paper-like substances which are carbonized without melting between the pressing-surfaces of a heating press, so as to sandwich said carbonaceous raw material between said paper-like substances and to contact said paper-like substances with each of the pressing-surfaces of said heating press, press-molding said composite material by raising a temperature of said heating press continuously heating the thus press-molded composite material under a pressure, thereby carbonizing the thus press-molded composite material, and calcining the thus carbonized material under a reduced-pressure or in an inert gas.

5 Claims, No Drawings

PROCESS FOR PRODUCING A CARBONACEOUS THIN PLATE

BACKGROUND OF THE INVENTION

The present invention relates to a process for producing a carbonaceous thin plate, and more in detail, relates to a process for producing a carbonaceous thin plate of large in size without occurrence of crevices and cracks therein.

Since carbonaceous materials are excellent in heat-resistance, corrosion-resistance and electric conductivity, application of a carbonaceous material of a thin plate type which is dense and small in permeability to gases, and liquids to separators of phosphoric acid type fuel cells or electrodes for zinc-halogen accumulators has been tried, and the establishment of an industrial process for producing a carbonaceous thin plate of a large type has been desired.

The carbonaceous thin plate according to the present invention may be used for the above-mentioned purposes and other purposes, for instance, electrodes for electrolysis, diaphragms for heat-resistant and corrosion-resistant heat exchangers than the above-mentioned uses.

Hitherto, as a graphite thin plate and a process for producing the same, a graphite thin plate prepared by adding a liquid thermosetting resin to micronized graphite preliminarily treated at a temperature of not less than 2700° C. and of not more than 100 micrometers in particle size, kneading the thus obtained mixture, thereby obtaining a paste, molding the thus obtained paste into a shape of thin plate by a roll-molding machine, hardening the thus molded thin plate by heating or hardening the thus molded thin plate while contacting heated plates with the both sides of the thin plate under a pressure and subjecting the hardened material to the conventional heating and carbonizing treatment and a process of production thereof have been disclosed in Japanese patent application laid-open (KOKAI) No. 59-26907 (1984).

However, in such a graphite thin plate, the adherence of the micronized graphite powders to the thermosetting resin is poor, and voids are apt to be formed in the interface therebetween in the time of subjecting the paste to carbonizing treatment, and it has been regarded difficult to make the gas-permeability of the product less than $1 \times 10^{-5}$ cm$^2$/s. Namely, such a graphite thin plate has a defect that the thickness of the plate must be large enough in the case where a high impermeability to gases is required.

In Japanese patent application laid-open (KOKAI) No. 59-21512 (1984), disclosed is a process for producing a glass-like carbon thin plate, comprising mixing a chlorinated vinyl chloride resin and/or a vinyl chloride resin with a furan resin, kneading the mixture, molding the thus obtained blend into a film or a sheet-like material and after subjecting the thus obtained molded body to a heat-treatment thereby obtaining a carbon-precursor, and calcinating the thus formed carbon-precursor in an inert atmosphere.

Although the gas-permeability of the thus obtained thin plate is as small as $10^{-11}$ to $10^{-10}$ cm$^2$/s (He, $\Delta P=1$ atm), since the yield of carbonization of the resin in the steps of calcination and carbonization is small and the contraction rate of the material is large, it is extremely difficult to produce a thin plate of large size without the occurrence of crevices and cracks and with accurate dimensions. In addition, since the resin as the raw material contains chlorine atoms, the chlorine atoms separate therefrom as strongly corrosive gaseous chlorine or hydrogen chloride, and accordingly, a special consideration for the construction and material of the apparatus is necessary in the case of carrying out the process actually.

In Japanese patent application laid-open (KOKAI) No. 58-150275 (1983), a cell separator of fuel cells comprising a glass-like carbon produced by molding and carbonizing a liquid furan resin, a liquid phenol resin or a mixture thereof is disclosed. Although the gas-permeability of glass-like carbon is extremely small, it takes a long period of time for producing the glass-like carbon and its producibility is poor resulting in a high cost of production.

Although the production of the carbonaceous thin plate has been tried by each of the above-mentioned processes, there is another process wherein a carbonaceous thin plate is produced by carbonizing a carbonaceous raw material, which is carbonized and solidifies after being softened by heating, while applying a pressure thereto by a heating press. Namely, a carbonaceous thin plate is produced by uniformly filling a carbonaceous raw material such as a pitch, etc. into a metal mold of a heating press, heating the carbonaceous raw material and after pressing at a temperature at which the carbonaceous raw material is softened, calcining and carbonizing the carbonaceous raw material at the temperature up to about 600° C. under the pressure, further calcinating or graphitizing the thus carbonized material at a predetermined temperature in a vacuum or in an inert gas.

In the above-mentioned process, the decomposition gas of the carbonaceous raw material generated at the time of carbonization under a pressure by the heating press is scattered and lost to outside through the thin plate or to outside through the interface between the thin plate and the pressing surface, or remains as bubbles within the thin plate. Accordingly, with the increase of the dimensions of the thin plate, it becomes difficult for the decomposition gas of the carbonaceous raw material to scatter to outside. As a result, the decomposition gas remains as bubbles within the thin plate and it becomes impossible to obtain a dense carbonaceous thin plate. In addition, since the volume of the carbonaceous raw material such as a pitch, etc. is reduced by calcination and carbonization, the thin plate apts to contract also in the direction of its surface. With the increase of the dimensions of the thin plate, the friction between the thin plate and the pressing surface of the heating press is increased resulting in impossibility of contraction and finally in occurrence of crevices and cracks in the thin plate.

The above-mentioned phenomena are remarkable in the case where a carbonaceous raw material which has a small yield of carbonization and which undergoes large contaction during carbonization is used.

Accordingly, hitherto a method has been adopted wherein the carbonization under a pressure is slowly carried out for a long time or a method has been taken wherein the carbonaceous raw material is preliminarily subjected to thermal treatment, thereby improving the yield of carbonization and reducing the amount of the decomposition gas at the time of carbonization. However, the above-mentioned processes are insufficient for the purpose.

As a result of the present inventors' studies for solving the problems of the above-mentioned conventional processes, it has been found by the present inventors that in the production of a carbonaceous thin plate by carbonizing a carbonaceous raw material while applying a pressure thereto by a heating press, the scattering of the decomposition gas to outside is facilitated by interposing a paper-like substance which is carbonized without melting between the carbonaceous raw material and the pressing surface of the heating press and that the paper-like substance prevents the adhesion of the carbonaceous raw material to the pressing surface of the heating press, and as a result the carbonacoues thin plate slides easily on the pressing surface thereof, and the occurrence of crevices and cracks due to contraction in carbonization is prevented, and on the basis of those findings, the present inventors have attained the present invention.

Namely, the first object of the present invention is to provide a process for easily producing industrially a dense carbonaceous thin plate of low permeability to gases or liquids and large in size, for instance, each about one meter in length and width without occurrence of crevices and cracks.

The second object of the present invention is to provide a carbonaceous thin plate of large in size not having crevices nor cracks.

SUMMARY OF THE INVENTION

In a first aspect of the present invention, provided there is a process for producing a carbonaceous thin plate comprising disposing a composite material comprising a carbonaceous raw material which is carbonized and solidifies after being softened by heating and paper-like substances which are carbonized without melting between the pressing-surfaces of a heating press, so as to sandwich said carbonaceous raw material between said paper-like substances and to contact said paper-like substances with each of the pressing-surfaces of said heating press, press-molding said composite material by raising a temperature of said heating press continuously heating the thus press-molded composite material under a pressure, thereby carbonizing the thus press-molded composite material, and calcining the thus carbonized material under a reduced-pressure or in an inert gas.

In a second aspect of the present invention, provided there is a carbonaceous thin plate produced by disposing a composite material comprising a carbonaceous raw material which is carbonized and solidifies after being softened by heating and paper-like substances which are carbonized without melting between the pressing-surfaces of a heating press, so as to sandwich said carbonaceous raw material between said paper-like substances and to contact said paper-like substances with each of the pressing-surfaces of said heating press, press-molding said composite material by raising a temperature of said heating press continuously heating the thus press-molded composite material under a pressure, thereby carbonizing the thus press-nolded composite material, and calcining the thus carbonized material under a reduced-pressure or in an inert gas.

DETAILED DESCRIPTION OF THE INVENTION

The constitutional feature of the present invention lies in a process for producing a carbonaceous thin plate wherein a carbonaceous raw material which is carbonized and solidifies after being softened by heating is carbonized by a heating press while press-molding and the thus carbonized material is calcined successively, characterized in that a composite material of the carbonaceous raw material and paper-like substances which are carbonized without melting is disposed between the pressing-surfaces of a heating press, so as to sandwich the carbonaceous raw material between the paper-like substances and to contact the paper-like substances with each of the pressing-surfaces of the heating press.

In the present invention, a carbonaceous raw material which is carbonized after being softened by heating is used as the carbonaceous raw material, and it is due to the necessity of once softening of the raw material for molding and sintering the molded material by heating and pressing thereof in the carbonization step.

Concretely, pitches or mixtures of a pitch and a pulverized carbonaceous material may be mentioned as the carbonaceous raw material of the present invention. As the pitches herein mentioned, a petroleum pitch, a coal pitch, a material produced by subjecting a petroleum pitch or a coal pitch to oxidative treatment, a material produced by pitchfying the product obtained by subjecting a coal tar, an asphalt, etc. to oxidative treatment, etc. may be used. On the other hand, as the pulverized carbonaceous material, for instance, carbon black, pulverized coke, pulverized graphite etc. may be mentioned.

In addition, as the carbonaceous raw material, those high in the yield of carbonization are favorable for producing a dense carbonaceous thin plate because of the small amount of the decomposition gas generated at the time of carbonization which is insufficient for forming bubbles in the product, and those high in the yield of carbonization is generally small in contraction on carbonization and those small in contraction on carbonization hardly show the occurrence of crevices and cracks. However, since the carbonaceous raw material high in the yield of carbonization shows a high softening point and is difficult to plastically deform, such a material is generally poor in shaping property and sintering property.

Consequently, it is preferable to carry out the selection of the carbonaceous raw materials while at least considering the above-mentioned situations. Although it is difficult to establish clear standards for the selection thereof, those exhibiting the yield of carbonization of 40 to 95% at the temperature up to 900° C. are preferable and accordingly, the above-mentioned pitches are preferably used. Pulverized carbonaceous materials such as carbon black may be added thereto for improving the yield of carbonization and reducing the contraction of the material on carbonization. However, since the large amount of addition of such a material reduces the density, increase the permeability to gases and liquids, and reduces the strength of the thus obtained thin plate, the amount of addition of such a pulverized carbonaceous material is preferably less than the half of the total amount of the raw material although it depends on the object of use of the product.

The process of the present invention is put into practice by the steps of (1) inserting a paper-like substance which is carbonized in a solid state without melting between the carbonaceous raw material such as pitch, etc. and the pressing surface of a heating press and (2) carbonizing the carbonaceous raw material and the paper-like substance by raising the temperature of the heating press slowly while applying a pressure. A decomposition gas is generated from the carbonaceous raw material such as pitch, etc. in the step of carbonization (the step of raising the temperature), and the thus generated decomposition gas is released easily outside the system through the layer of the paper-like substance inserted between the carbonaceous raw material and the pressing surface of the heating press. Accordingly, the decomposition gas does not remain as bubbles within the thin plate, and it is possible to produce a dense carbonaceous thin plate. The paper-like substance herein mentioned indicates the substance prepared by twisting vegetable fibers and other fibers and agglutinating thereof.

Since the paper-like substance is constituted by the twisting of the fibers, there are voids therein and the paper-like substance is permeable to gases.

In order that the paper-like substance exhibits the permeability to gases during the step of carbonization under a pressure, it is necessary that the paper-like substance is carbonized in a solid state without melting, thereby retaining its permeability to gases.

In the conventional process of not inserting the paper-like substance, since the carbonaceous raw material is directly contacted with the pressing surface of the heating press and is softened without giving any passage of the decomposition gas to outside, it is difficult to release the decomposition gas to outside and the decomposition gas is apt to remain as bubbles within the thin plate resulting in the difficulty of producing the dense carbonaceous thin plate.

According to the process of the present invention, the direct contact of the carbonaceous raw material with the pressing surface of the heating press is prevented by the paper-like substance, and the paper-like substance is carbonized without melting, and consequently, the thin plate may easily slide on the pressing surface of the heating press without adhering thereto. Accordingly it is possible to prevent the occurrence of crevices and cracks in the carbonaceous thin plate.

As the paper-like substance satisfying the above-mentioned objectives, a sheet of paper manufactured from vegetable fibers by a known method is adequate for the objectives.

In addition, a sheet of paper manufactured mainly from vegetable fibers with a small amount of synthetic fibers may be used as far as the permeability of the sheet of paper to gases is not remarkably deteriorated by the melting of the synthetic fibers in the step of carbonization under a pressure. As the synthetic fibers used in a small amount, those of polyethylene, polypropylene, rayon, acetate, vinylon, nylon, acrylate, polyester, etc. may be mentioned, and the amount of addition thereof is preferably not more than 30% by weight of the raw material for the sheet of paper.

The paper-like substance used according to the present invention remains as a carbonized material in the outer layer part of the carbonaceous thin plate while constituting a part of the carbonaceous thin plate. Consequently, the density of the outer layer part of the carbonaceous thin plate is different from the density of the inner part thereof.

The thickness of the outer layer part depends to the thickness of the paper-like substance used. Although the thickness of the paper-like substance is decided in consideration of the use of the product, namely the carbonaceous thin plate, the effect in the steps of production and the economicity in production, it is preferable that the thickness of the paper-like substance is not more than 100 micrometers In most of the papers produced at present, an inorganic substance such as a filler of terra alba, titanium oxide, etc. and pigments is added for the purpose of densifying, opaquing and colorating of the paper. For the purpose of the present invention, a sheet of paper containing such an inorganic substance is suitably used, however, there are cases where the containing of inorganic impurities is not favorable according to the use of the product, namely the carbonaceous thin plate. Accordingly, the paper which has manufactured without addition of inorganic substances such as fillers, pigments, etc. and has not been subjected to after processing such as coating is large in permeability to gases and prevents the adhesion of the carbonaceous raw material to the metal mold, and such a paper is particularly favorable for use in the present invention.

As the method of inserting the paper-like substance which is carbonized without melting between the carbonaceous raw material and the pressing surface of the heating press, either of the following two methods is adopted. Namely in the first method, a paper-like substance is disposed on the bottom of the metal mold of the press and after filling a pulverized carbonaceous raw material uniformly in the upper space thereon, another paper-like substance and the upper metal mold of the press are disposed in the order. In the second method, the carbonaceous raw material is converted into a slurry or a solution by a solvent, a carbonizable supporting body is coated or impregnated with the slurry or solution, a sheet-like carbonaceous raw material is produced by evaporating the solvent from the supporting body, a necessary number of such a sheet-like carbonaceous raw material are laminated, paper-like substances are disposed above and below the thus laminated sheet-like carbonaceous raw materials, and the thus combined material is filled in the metal mold of the heating press.

As the carbonizable supporting body used for processing the carbonaceous raw material into a sheet form, those which become to be one-body with the carbonaceous raw material after being carbonized, thereby constituting a carbonaceous thin plate are favorable and the paper-like material manufactured from organic fibers, carbon fibers or a mixture thereof is suitable for the purpose.

According to the present invention, the carbonaceous thin plate is produced by inserting a paper-like substance which is carbonized without melting between the carbonaceous raw material and the pressing surface of the heating press, raising the temperature of the heating press, press-molding the carbonaceous raw material and the paper-like substance and continuing the heating under a pressure, thereby carbonizing the press-molded material.

As the conditions of press-molding, the pressure of not more than 100 kg/cm$^2$G. at the temperature of 150° to 450° C. at which the carbonaceous raw material softens and the pressure-retaining time of 10 to 120 min are suitably used. It is preferable to carry out the carbonization under a pressure of 0.1 to 100 kg/cm$^2$G.

while heating the material to a temperature of about 600° to 650° C. Since the carbonization under a pressure is carried out for preventing the bubbling due to the generation of the decomposition gas from the carbonaceous raw material which is still in the softened state and also preventing the bending of the thus produced carbonaceous thin plate, it is sufficient to carry out the carbonization by heating the heating press to a temperature of about 600° to 650° C. at which the carbonaceous raw material solidifies. The thin plate which has been heated to the temperature of about 600° to 650° C. under a pressure, thereby having been carbonized is taken out from the press after cooling and after being interposed between the two flat and smooth graphite plates, the carbonized thin plate is further calcined or graphitized under a reduced pressure or in an inert gas to obtain the carbonaceous thin plate.

According to a process of the present invention comprising disposing a composite material comprising a carbonaceous raw material which is carbonized and solidifies after being softened by heating and paper-like substances which are carbonized without melting between the pressing-surfaces of a heating press, so as to sandwich said carbonaceous raw material between said paper-like substances and to contact said paper-like substances with each of the pressing-surfaces of said heating press, press-molding said composite material by raising a temperature of said heating press continuously heating the thus press-molded composite material under a pressure, thereby carbonizing the thus press-molding composite material, and calcining the thus carbonized material under a reduced-pressure or in an inert gas, that is, in the production of a carbonaceous thin plate by carbonizing a carbonaceous raw material such as a pitch, etc. while pressing the carbonaceous raw material by a heating press, (1) inserting a paper-like substance, for instance, a sheet of vegetable fibers paper which is carbonized in a solid state without melting between the above-mentioned carbonaceous raw material and the pressing surface of the heating press, thereby (2) releasing the decomposition gas generated at the time of carbonization of the carbonaceous raw material to outside of the system and (3) letting the decomposition gas not to remain as bubbles within the carbonaceous thin plate, a dense carbonaceous thin plate of a large size is easily produced.

Also, according to a process of the present invention comprising disposing the paper-like substance on the both sides of the carbonaceous raw material, thereby avoiding the direct contact of the carbonaceous raw material with the pressing surface of the heating press, preventing the adherence of the carbonaceous raw material to the pressing surface of the heating press, facilitating the sliding of the carbonaceous thin plate along the pressing surface of the heating press, facilitating the easily shrinking of the carbonaceous thin plate with the progress of the carbonization and preventing the occurrence of crevices and cracks in the product, a carbonaceous thin plate of a large size is easily produced.

The present invention will be explained more in detail while referring to the non-limitative Examples and Comparative Examples as follows:

In this connection, the softening point of the material and the permeation coefficient of the material to a gas are determined by the following methods, respectively.

Determination of the softening point of a material

While using a KOKA-type flowtester (made by SHIMAZU Works Co., Ltd.) one gram of a specimen pulverized to a size of not more than 250 micrometers is filled up in a cylinder which is 1 cm$^2$ in cross-sectional area and has a nozzle of 1 mm in diameter at the bottom thereof and the specimen is heated at a temperature raising rate of 6° C./min while applying a pressure of 10 kg/cm$^2$G. on the specimen.

With the raising of the temperature, although the packing rate of the specimen in the cylinder is improved by the softening of the specimen, the reduction of the volume of the specimen stops over the certain temperature. With the further continued raising of the temperature, the specimen melts and flows to outside from the nozzle at the bottom of the cylinder. The temperature at which the reduction of the volume of the powdery specimen stops is defined as the softening point of the specimen. In addition, there may be cases where such a flowing of the molten specimen from the nozzle does not occur when the softening point of the specimen is high enough.

Determination of the gas permeability of the specimen

The gas permeability of a specimen is determined in conformity to "Method for determination of the mobility of oxygen gas through a plastic film and sheet" of ASTM D-3985-81. Namely, while flowing gaseous nitrogen along one side of the specimen (a thin plate) to intercept a oxygen gas permeation from an atmosphere thereinto and introducing oxygen gas of 100% in purity into the other side of the specimen, the amount of the oxygen gas which permeates and passes through the thickness of the specimen into the nitrogen gas side is determined by an electrically quantifiable method while using an oxygen sensor. Accordingly, the value of the gas permeation coefficient (the unit: cm$^2$/s) according to the present invention is the determined value in the case the total pressure is due to gaseous oxygen under a pressure of 1 atm (the partial pressure of gaseous oxygen, namely $\Delta P$, is 1 atm) at a determination temperature of 20° C., and the determined value is represented by the value calculated as the gas volume under standard state. In addition, on the assumption that the specimen of the carbonaceous thin plate of the present invention has a uniform quality all over, the rate of gas-permeability [cm$^3$(S.T.P.)/cm$^2$.s] is multiplied by the thickness of the specimen (the unit: cm) to obtain the gas permeation coefficient (cm$^2$/s; O$_2$, $\Delta P$=1 atm).

EXAMPLE 1

An ethylene bottom oil was pitchfied by subjecting the oil to thermal treatment for 3 hours at 370° C., thereby promoting the heavification thereof, and at the same time, removing the low-boiling components therefrom, and the thus produced pitch was pulverized into perticles of not more than 100 micrometers in size and was heated to 190° C. at a rate of 10° C./hour in air to obtain the pitch (A) which showed the softening point of 285° C. and the yield of carbonization of 72% by weight under the calcination at 900° C.

The pitch (B) was produced by thermally treating the pitch (A) for 2 hours in gaseous nitrogen atmosphere at 400° C. and showed the softening point of 314° C. and the yield of carbonization of 82% by weight under the calcination at 900° C.

On the bottom of a metal mold (600 mm × 600 mm) of a heating press, a sheet of paper of 35 micrometers in thickness which was manufactured by only using pulp without the addition of any inorganic substances was disposed, a carbonaceous raw material prepared by uniformly mixing the pitch (A) and the pitch (B) in a weight ratio of 1:1 in a Henschel mixer was filled in the upper space on the sheet of paper without unevenness, and after covering the thus combined material with a sheet of the same paper as above, the upper metal mold of the heating press was descended. The heating press was heated to 380° C. at a rate of 100° C./hour, and after pressing the material for 30 min under a pressure of 15 kg/cm$^2$G., the pressure was reduced to 2 kg/cm$^2$G. and the heating press was heated to 600° C. at a rate of 50° C./hour and the heating press was cooled to obtain a thin plate.

The thus obtained thin plate was interposed between the two flat and smooth graphite plates and then was calcined in a vacuum oven at 2000° C. Thereby, it was possible to produce a dense carbonaceous thin plate without any occurrence of crevices and cracks therein.

The specific properties of the thus obtained carbonaceous thin plate are shown in Table 1.

TABLE 1

| Thickness (mm) | Apparent density (g/cm$^3$) | Gas permeation coefficient (cm$^2$/s) | Specific resistance (Ohm cm) | Bending strength (kg/cm$^2$) |
| --- | --- | --- | --- | --- |
| 1.1 | 2.05 | 3.04 × 10$^{-8}$ | 2.33 × 10$^{-3}$ | 1980 |

Comparative Example

In the same manner as in Example 1 except for not inserting the sheet of paper between the carbonaceous raw material and the pressing surface of the heating press, a carbonaceous thin plate was produced by cooling the heating press after heating to 600° C.

It was found that the thus produced thin plate was splitted into a mosaic-like state in the metal mold, and a number of bubbles were observed in the thus splitted thin plate.

EXAMPLE 2

The pitch (C) of a softening point of 224° C. and of a yield of carbonization of 69 % by weight under calcination at 900° C. was produced by thermally treating an ethylene bottom oil for 5 hours at 400° C. under a reduced pressure of 20 mmHg abs. By uniformly mixing 70% by weight of the pitch (C) pulverized to not more than 10 micrometers in size and 30% by weight of a powdery graphite of not more than 10 micrometers in size in a Henschel mixer, a carbonaceous raw material was prepared. The thus prepared carbonaceous raw material and a sheet of paper manufactured from a mixture of a pulp and 20% by weight of Vinylon ® fibers (made by KURARE Co., Ltd. under the registered trade name of KURAREVINYLON VPB 105—2×3 mm) were disposed in a heating press in the same manner as in Example 1, the heating press was heated to 350° C. at a rate of 100° C./hour and after pressing for 30 min under a pressure of 50 kg/cm$^2$G., the pressure was reduced to 5 kg/cm$^2$ G. and the heating press was heated to 500° C. at a rate of 30° C./hour. Thereafter, the pressure was released and the heating press was heated to 600° C. at a rate of 50° C./hour, and then the thus heated carbonaceous raw material was calcined at 2000° C. to obtain a carbonaceous thin plate of 1.3 mm in thickness. The specific properties of the thus obtained carbonaceous thin plate are shown in Table 2.

TABLE 2

| Thickness (mm) | Apparent density (g/cm$^3$) | Gas permeation coefficient (cm$^2$/s) | Specific resistance (Ohm cm) | Bending strength (kg/cm$^2$) |
| --- | --- | --- | --- | --- |
| 1.3 | 1.95 | 2.24 × 10$^{-8}$ | 2.33 × 10$^{-3}$ | 1580 |

EXAMPLE 3

A slurry was prepared by pulverizing and mixing 6 parts by weight of the pitch (A) used in Example 1, 14 parts by weight of the pitch (B) also used in Example 1, 0.5 part by weight of methylcellulose (made by SHI-NETSU Chem. Co., Ltd. under the registered trade name of METLOSE 90SH-4000) and 80 parts by weight of water for 24 hours in a ball mill. On the other hand, by using fibers prepared by subjecting pitch fibers to oxidative infusibilization and futher calcining the thus infusibilized pitch fibers at 600° C. in gaseous nitrogen, a paper-like supporting body of an areal weight of 30 g/m$^2$ was prepared. After impregnating the thus prepared paper-like supporting body uniformly with the above-mentioned slurry, the wet supporting body was dried to obtain a sheet-like carbonaceous raw material of an areal weight of 210 g/m$^2$.

The material prepared by laminating 4 pieces of the thus obtained sheet-like carbonaceous raw material was named as X$_1$, the sheet of paper used in Example 1 was named as Y$_1$ and a stainless-steel plate of 0.4 mm in thickness having two flat and smooth surfaces was named as Z$_1$, and a metal mold (of a dimension of 600 mm × 600 mm) of the heating press was filled with the above three kinds of material in the order of Z$_1$ Y$_1$ X$_1$Y$_1$Z$_1$Y$_1$X$_1$Y$_1$Z$_1$...Z$_1$Y$_1$X$_1$Y$_1$Z$_1$ from the bottom of the metal mold, so as to fill 30 pieces of X$_1$ in total therein, the upper metal mold was descended. The heating press was heated to 390° C. at a rate of 100° C./hour, and after pressing the thus combined materials for 30 min under a pressure of 20 kg/cm$^2$G., the pressure was reduced to 3 kg/cm$^2$G. and the heating press was heated to 600° C. at a rate of 30° C./hour and then cooled to room temperature to obtain a thin plate. The thus obtained thin plate was interposed between the two graphite plates having flat and smooth surfaces and then was calcined in a vacuum oven at 2000° C. Thereby, 30 pieces of the dense carbonaceous thin plate could be produced. The specific properties of the thus obtained carbonaceous thin plate are shown in Table 3.

TABLE 3

| Thickness (mm) | Apparent density (g/cm$^3$) | Gas permeation coefficient (cm$^2$/s) | Specific resistance (Ohm cm) | Bending strength (kg/cm$^2$) |
| --- | --- | --- | --- | --- |
| 0.47 | 1.98 | 2.78 × 10$^{-8}$ | 2.26 × 10$^{-3}$ | 2030 |

EXAMPLE 4

The pitch (D) showing the softening point of 330° C. and the yield of carbonization of 85% by weight under calcination at 900° C. was prepared by subjecting a coal tar to thermal treatment for 3 hours at 300° C. while blowing air thereinto, pulverizing the thus treated coal tar to not more than 100 micrometers in size and heating the thus pulverized material to 225° C. at a rate of 10° C./hour in air.

A slurry was prepared by pulverizing and mixing 12 parts by weight of the pitch (A) prepared in Example 1, 18 parts by weight of the thus obtained pitch (D), 65 parts by weight of water, 5 parts by weight of methanol and 0.4 part by weight of the methylcellulose (refer to Example 3) for 24 hours in a ball mill. After applying the thus prepared slurry onto a paper-like supporting body of an areal weight of 25 g/m² manufactured from flame-proof fibers of polyacrylonitrile series (made by TOHO Rayon Co., Ltd. under the registered trade name of PYROMEX), the thus treated supporting body was dried to obtain a sheet-like carbonaceous raw material of an areal weight of 190 g/m². After laminating two pieces of the thus obtained sheet-like carbonaceous raw material and interposing the laminate between two sheets of the same paper as in Example 1, the thus combined materials were filled in the metal mold of a heating press, and the heating press was heated to 430° C. at a rate of 50° C./hour, and after pressing the combined materials for one hour under a pressure of 70 kg/cm²G., the pressure was reduced to 5 kg/cm²G. and then the heating press was heated to 650° C. at a rate of 15° C./hour. Thereafter, the heating press was cooled to obtain a thin plate. The thus obtained thin plate was interposed between two graphite plates having flat and smooth surfaces and was calcined at 2000° C. to produce the carbonaceous thin plate. The specific properties of the thus produced carbonaceous thin plate are shown in Table 4.

TABLE 4

| Thickness (mm) | Apparent density (g/cm³) | Gas permeation coefficient (cm²/s) | Specific resistance (Ohm cm) | Bending strength (kg/cm²) |
| --- | --- | --- | --- | --- |
| 0.23 | 1.76 | $3.51 \times 10^{-8}$ | $2.9 \times 10^{-3}$ | 1820 |

What is claimed is:

1. A process for producing a carbonaceous, thin and dense plate comprising:
   (1) disposing a composite material comprising:
      (A) a carbonaceous raw material which is carbonized and solidifies after being softened by heating; and
      (B) paper-like substances which are carbonized without melting
      between the pressing surfaces of a heating press, so as to sandwich said carbonaceous raw material between said paper-like substances and to contact said paper-like substances with each of the pressing-surfaces of said heating press,
      said carbonaceous raw material being (i) a pitch or a mixture of a pitch and a pulverized carbonaceous material or (ii) a sheet-like carbonaceous raw material obtained by preparing a slurry or a solution of powdery carbonaceous raw material, impregnating or applying the thus prepared slurry or solution to a carbonizable supporting body, and evaporating the solvent from the thus treated carbonizable supporting body, said carbonizable supporting body being a paper-like material manufactured from organic fibers, carbon fibers or a mixture thereof; and
      each of said paper-like substances having a thickness of not more than 100 micrometers and being (i) a sheet of paper manufactured from vegetable fibers or (ii) a sheet of paper manufactured mainly from vegetable fibers with not more than 30% by weight of synthetic fibers based on the total weight of the raw material for the sheet of paper;
   (2) press-molding the thus disposed composite material under the conditions of a temperature of 150° to 450° C., a pressure of not more than 100 kg/cm² G. and a pressure-retaining time of 10 to 120 min.;
   (3) continuously heating the thus press-molded composite material to a temperature of about 600° to 650° C. under a pressure of 0.1 to 100 kg/cm²G, thereby carbonizing the thus press-molded composite material;
   (4) taking out the thus obtained carbonized thin plate from the press; and
   (5) interposing the carbonized thin plate between two pieces of flat and smooth graphite plate and further, calcining or graphitizing the interposed plate under a reduced pressure or in an inert gas to obtain said carbonaceous, thin and dense plate.

2. A process according to claim 1, wherein said pitch is selected from the group consisting of a petroleum pitch, a coal pitch, a material obtained by subjecting a petroleum pitch or a coal pitch to oxidative treatment, and a material obtained by subjecting a coal tar of an asphalt to oxidative treatment and further subjecting the thus treated material to pitch-preparation treatment.

3. A process according to claim 1, wherein said pulverized carbonaceous material is carbon black, pulverized coke or pulverized graphite.

4. A process according to claim 1, wherein said carbonaceous raw material is in powder form.

5. A process according to claim 1, wherein said synthetic fibers are selected from the group consisting of fibers of polyethylene, polypropylene, rayon, acetate, vinylon, nylon, acrylate(polyacrylontrile) and polyester.

* * * * *